United States Patent [19]

Huang et al.

[11] Patent Number: 5,555,058
[45] Date of Patent: Sep. 10, 1996

[54] VIEWFINDER ILLUMINATION SCALE ADJUSTING MECHANISM FOR CAMERAS

[75] Inventors: Yeou-Fu Huang; Yan-Hone Tsai, both of Taichung County, Taiwan

[73] Assignee: Sinpo Optical Co., Ltd., Taichung County, Taiwan

[21] Appl. No.: 528,225

[22] Filed: Sep. 14, 1995

[51] Int. Cl.$^6$ ................................. G03B 13/10
[52] U.S. Cl. ........................................... 354/222
[58] Field of Search ............................. 354/221–222, 354/223

[56] References Cited

U.S. PATENT DOCUMENTS

| | | |
|---|---|---|
| 2,187,246 | 1/1940 | Nerwin . |
| 2,331,667 | 10/1943 | Eaton . |
| 2,881,684 | 4/1959 | Brohl et al. . |
| 3,619,202 | 11/1971 | Bellows . |
| 4,283,860 | 8/1981 | Rucker ........................... 33/277 |
| 4,931,818 | 6/1990 | Gates ........................... 354/222 |
| 5,257,055 | 10/1993 | Cho et al. ...................... 354/222 |
| 5,381,205 | 1/1995 | Kotani et al. ................... 354/400 |
| 5,410,381 | 4/1995 | Kameyama et al. ............. 354/222 |

Primary Examiner—Michael L. Gellner
Assistant Examiner—Daniel Chapik
Attorney, Agent, or Firm—Bacon & Thomas

[57] ABSTRACT

A viewfinder illumination scale adjusting mechanism including a sliding block disposed at one side of the viewfinder of a camera, a first cover board and a second cover board vertically spaced by the viewfinder and defining a respective illumination window of a different size, and a switching lever moved to switch on/off the electric circuit of the camera, wherein when the sliding block is shifted upwards, the switching lever is moved to switch on the electric circuit of the camera, and the first cover board is moved to coincide its illumination window with the viewfinder; when the sliding block is shifted downwards, the switching lever is moved to switch off the electric circuit of the camera, and the second cover board is moved to coincide its illumination window with the view finder; when the sliding block is shifted to the middle position, the two cover boards are turned away from the viewfinder, and the switching lever is forced to switch off the electric circuit.

1 Claim, 5 Drawing Sheets

VIEWFINDER ILLUMINATION SCALE ADJUSTING MECHANISM FOR CAMERAS

BACKGROUND OF THE INVENTION

The present invention relates to a viewfinder illumination scale adjusting mechanism which can be conveniently operated to adjust the illumination scale of the viewfinder of a camera so that the range of exposure of the film is adjusted.

A variety of cameras have been disclosed for taking photographs, and have appeared on the market. A camera 10 generally has a viewfinder 11 and a scale illumination window 12 on the viewfinder 11 (see FIG. 1). The scale illumination window 12 controls the range of exposure of the film. Because this scale illumination window 12 is fixedly secured to the inside of the camera 10, the range of exposure of the film is not adjustable. Because the range of exposure of the film is normally set at 30.2 mm×16.7 mm, the size of the picture is proportional to 3×5. Therefore, this structure of camera does not allow the user to change the range of exposure of the film.

SUMMARY OF THE INVENTION

The present invention has been accomplished to provide a viewfinder illumination scale adjusting mechanism which eliminates the aforesaid problem. According to the preferred embodiment of the present invention, the viewfinder illumination scale adjusting mechanism comprises a sliding block disposed at one side of the viewfinder of a camera, a first cover board and a second cover board vertically spaced by the viewfinder and defining a respective illumination window of a different size, and a switching lever moved to switch on/off the electric circuit of the camera, wherein when the sliding block is shifted upwards, the switching lever is moved to switch on the electric circuit of the camera, and the first cover board is moved to coincide its illumination window with the viewfinder; when the sliding block is shifted downwards, the switching lever is moved to switch off the electric circuit of the camera, and the second cover board is moved to coincide its illumination window with the view finder; when the sliding block is shifted to the middle position, the two cover boards are turned away from the viewfinder, and the switching lever is forced to switch off the electric circuit.

DETAILED DESCRIPTION OF THE PREFERRED EMBODIMENT

Figure 1:
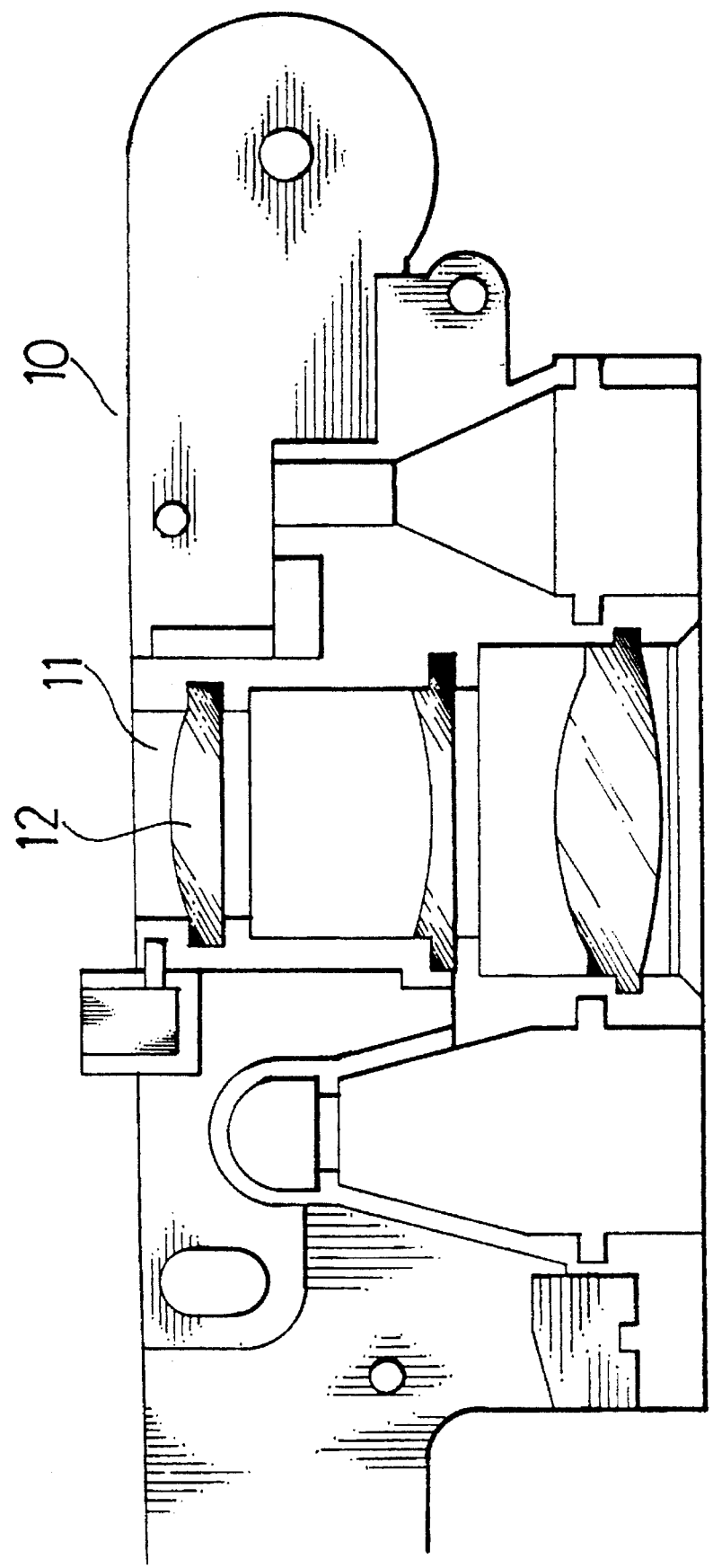
FIG. 1 is a bottom view showing the position of the viewfinder of a conventional camera.
Figure 2:
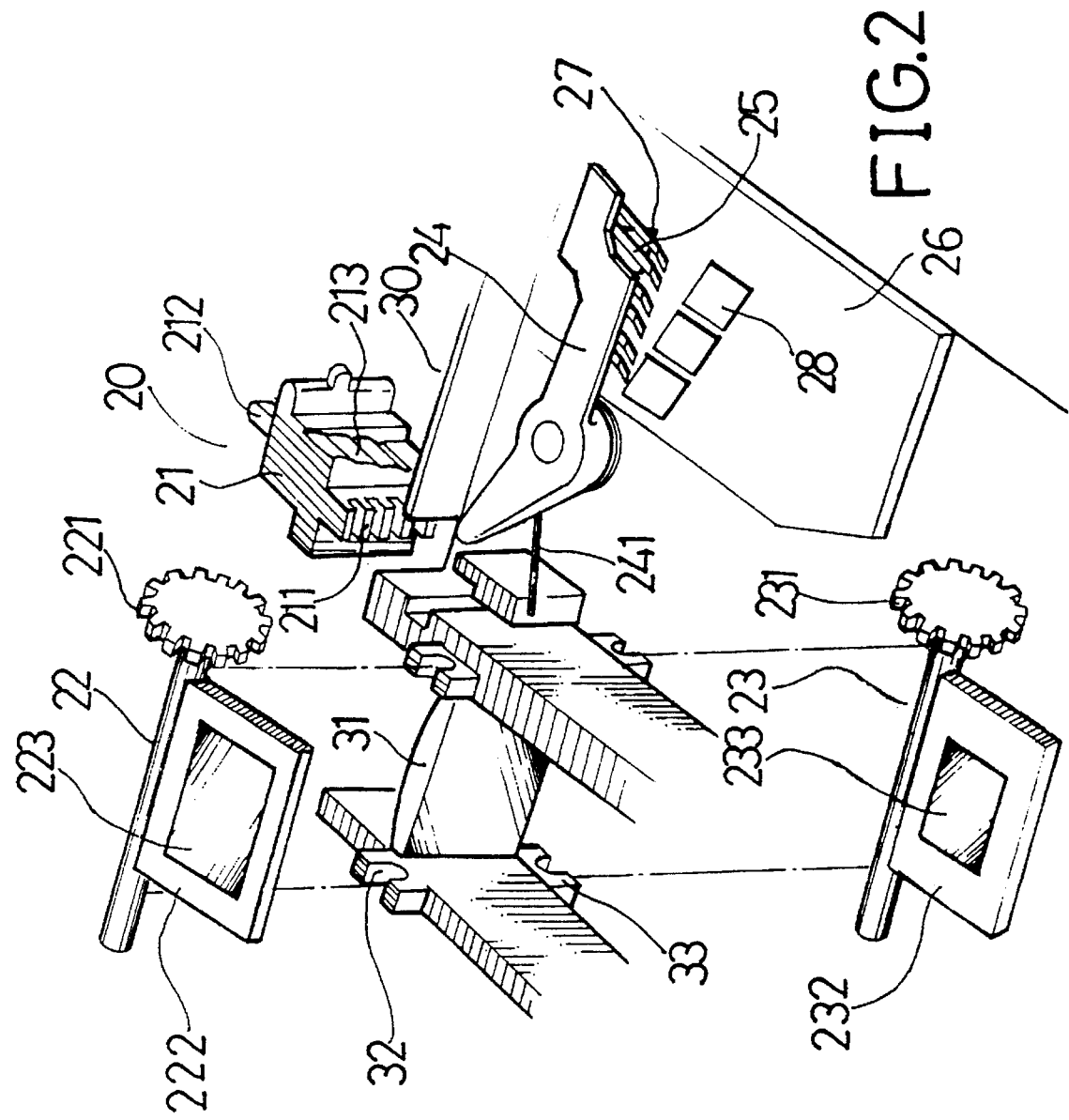
FIG. 2 is an exploded view of the viewfinder illumination scale adjusting mechanism according to the present invention.
Figure 3:
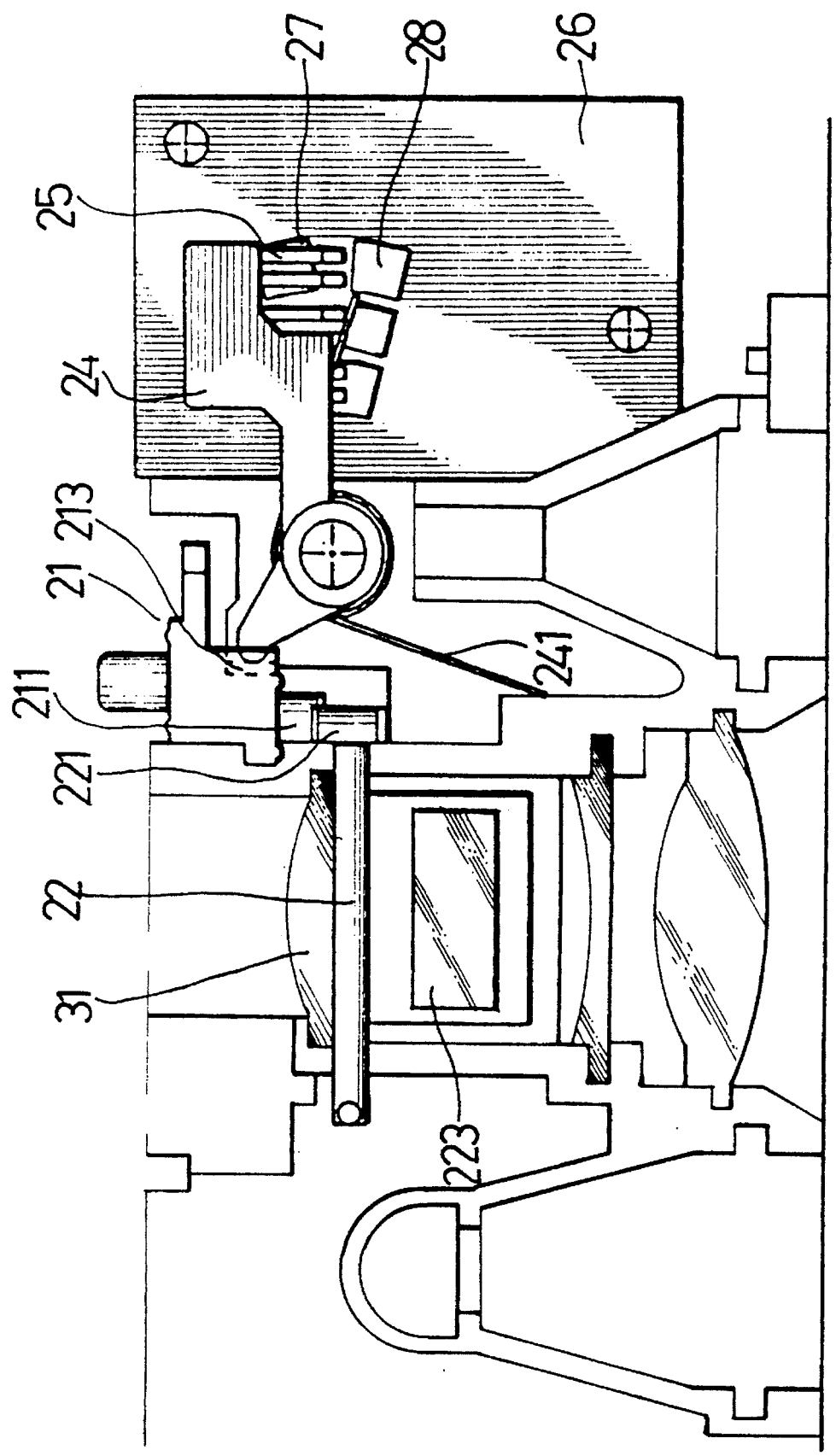
FIG. 3 is a bottom view of the viewfinder illumination scale adjusting mechanism shown in FIG. 2.

Referring to FIGS. 2 and 3, the viewfinder illumination scale adjusting mechanism, referenced by 20 comprises a sliding block 21 movably mounted at one side of the viewfinder 31 of a camera 30. The sliding block 21 comprises a vertical rack 211 at the back side, a knob 212 at the front side, and a stepped transmission portion 213 at one lateral side. A first pivot 22 and a second pivot 23 are respectively revolvably supported on bearings 32 and 33 at two vertically spaced opposite sides relative to the viewfinder 31. Two gears 221 and 231 are respectively fixedly fastened to the pivots 22 and 23 at one end and meshed with the vertical rack 211 of the sliding block 21. Two cover boards, namely, the first cover board 222 and the second cover board 232 are respectively perpendicularly fixed to the pivots 22 and 23, each cover board 222 or 232 defining a respective window 223 or 233. A switching lever 24 is mounted inside the camera 30 and forced by a spring 241 into engagement with the stepped transmission portion 213. When the knob 212 is moved vertically, the switching lever 24 is turned horizontally. A plurality of metal contact strips 25 are fixed to the switching lever 24 at suitable locations. A base plate 26 is mounted inside the camera 30 below the switching lever 24 to hold two sets of copper contacts 27 and 28. By shifting the knob 212 vertically, the metal contact strips 25 are moved to connect the copper contacts 27 and 28 or to disconnect them. When the copper contacts 27 and 28 are connected by the metal contact strips 25, the electric circuit of the camera 30 is turned on; when the copper metal contact strips 25 are disconnected from the copper contacts 27 and 28, the electric circuit of the camera 30 is turned off.

Referring to FIG. 2 again, when the knob 212 is shifted to the middle position (the non-working position), the cover boards 222 and 232 are horizontally disposed at the top and bottom sides of the viewfinder 31, the switching lever 24 does no work, and the metal contact strips 25 are disconnected from the copper contacts 27 and 28, therefore the electric circuit of the camera is off. At this stage, the illumination scale of the viewfinder 31 is maintained unchanged, and the range of exposure of the film is 15.6 mm×27.4 mm.

Figure 4:
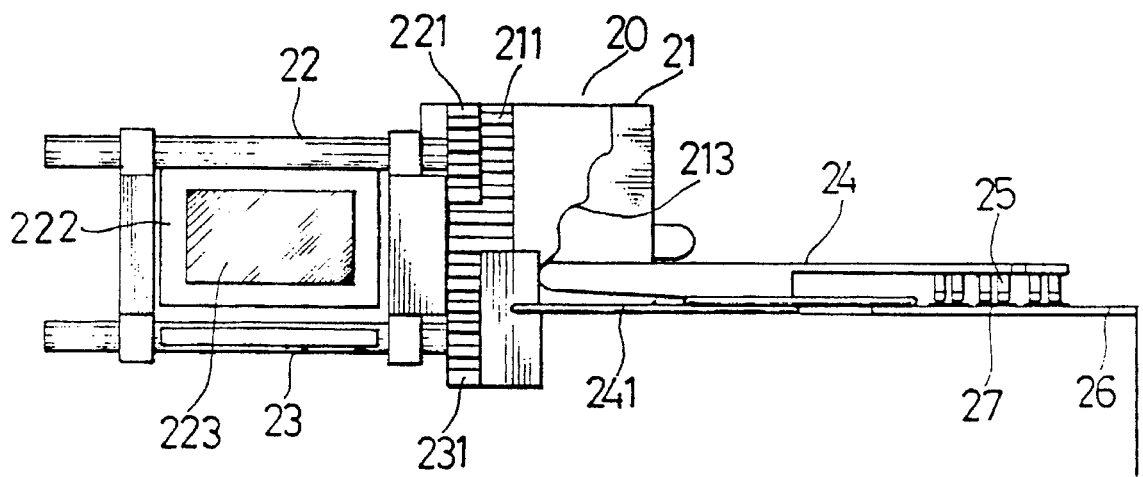
FIG. 4 shows the first cover board covered on the viewfinder according to the present invention.
Figure 6:
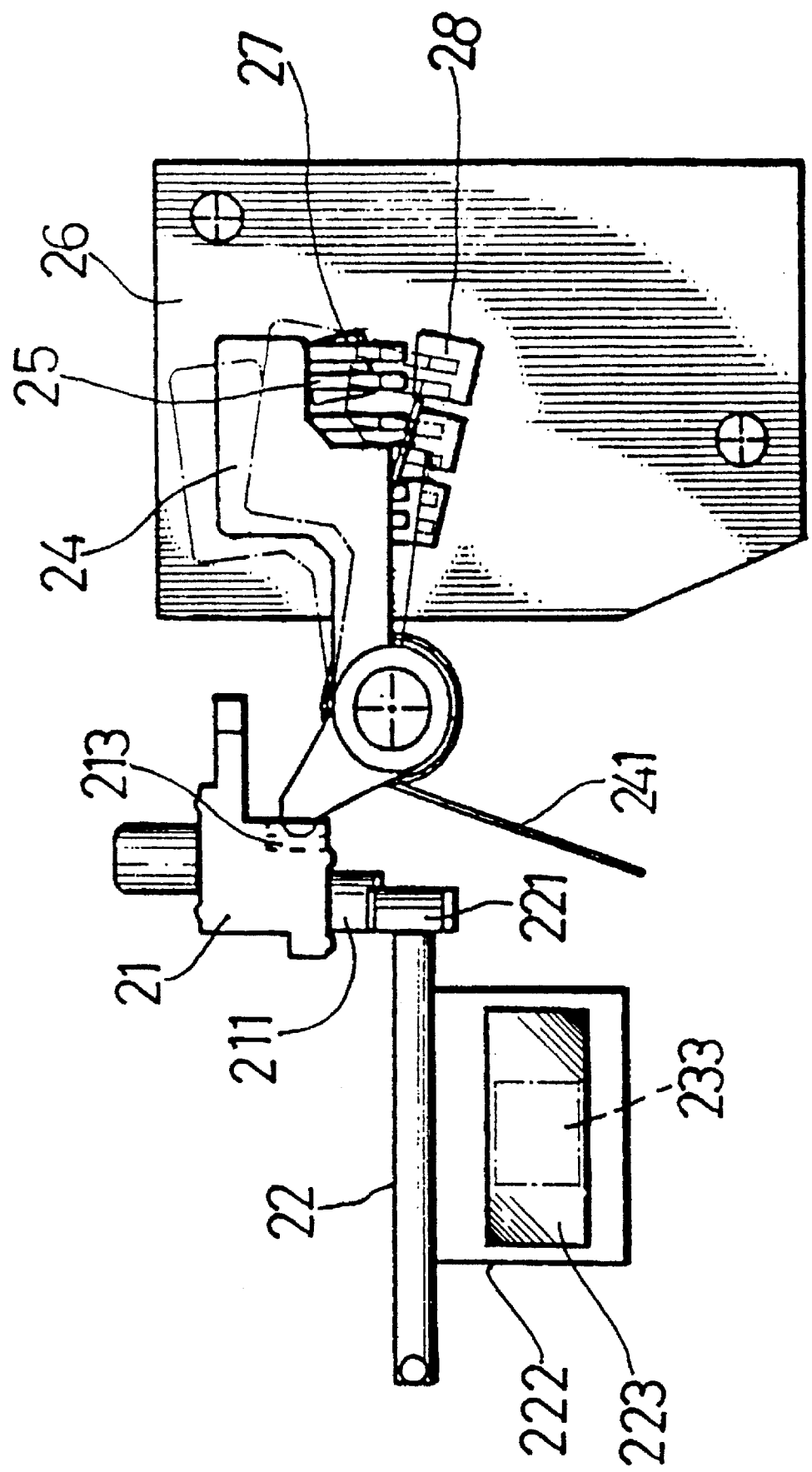
FIG. 6 shows the movement of the metal contact strips of the lever relative to the copper contacts on the base plate according to the present invention.

Referring to FIGS. 4 and 6, when the knob 212 is shifted upwards, the gear 221 is driven by the rack 211 to turn the first pivot 22 counter-clockwise, causing the cover board 22 turned downwards through 90° angle and covered on the viewfinder 31, therefore the window 223 of the cover board 222 coincides with the viewfinder 31, and the illumination scale of the viewfinder 31 is replaced by the window 223 of the cover board 22. Because the size of the window 223 is 9.6 mm ×27.4 mm, the range of exposure of the film is 9.6 mm×27.4 mm at this stage. At the same time, the switching lever 24 is moved by the stepped transmission portion 213 to force the metal contact strips 25 into contact with the copper contacts 27 and 28, and therefore the electric circuit of the camera 30 is turned on.

Figure 5:
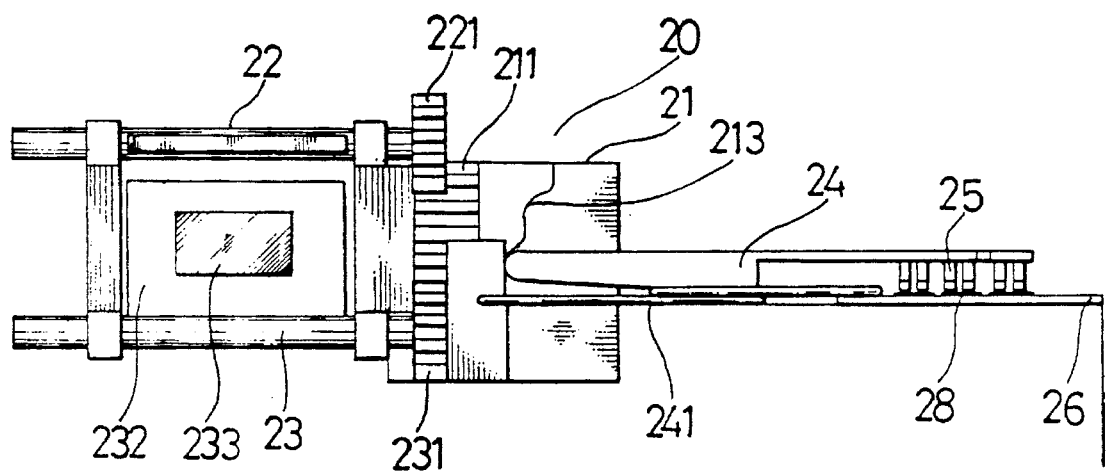
FIG. 5 shows the second cover board covered on the viewfinder according to the present invention.

Referring to FIGS. 5 and 6, when the knob 212 is shifted downwards, the gear 231 is driven by the rack 211 to turn the second pivot 22 clockwise, causing the cover board 23 turned upwards through 90° angle and covered on the viewfinder 31, therefore the window 233 of the cover board 232 coincides with the viewfinder 31, and the illumination scale of the viewfinder 31 is replaced by the window 233 of the cover board 232. Because the size of the window 233 is 15.6 mm×22.3 mm, the range of exposure of the film is 15.6 mm×22.3 mm at this stage. At the same time, the switching lever 24 is moved by the stepped transmission portion 213 to force the metal contact strips 25 into contact with the copper contacts 27 and 28, and therefore the electric circuit of the camera 30 is turned on.

It is to be understood that the drawings are designed for purposes of illustration only, and are not intended as a definition of the limits and scope of the invention disclosed.

We claim:

1. A viewfinder illumination scale adjusting mechanism comprising:

a sliding block disposed at one side of the viewfinder of a camera, said sliding block comprising a vertical rack at a back side thereof, a knob at a front side thereof, and a stepped transmission portion at one lateral side thereof;

a first pivot horizontally disposed above said view finder, a first gear fixedly mounted on said first pivot at one end and meshed with the vertical rack of said sliding block;

a first cover board fixedly perpendicularly connected to said first pivot and defining an illumination window;

a second pivot horizontally disposed below said view finder, a second gear fixedly mounted on said second pivot at one end and meshed with the vertical rack of said sliding block;

a second cover board fixedly perpendicularly connected to said second pivot and defining an illumination window; and a spring supported switching lever engaged with the stepped transmission portion of said sliding block and moved by it between the On position and the Off position to switch on or off the electric circuit of said camera;

wherein when said sliding block is shifted downwards, said second pivot is driven by said second gear to turn said second cover board upwards through 90°, causing the illumination window of said second cover board to coincide with said viewfinder, and at the same time said switching lever is forced into the On position by said stepped transmission portion; when said sliding block is shifted upwards, said first pivot is driven by said second gear to turn said second cover board downwards through 90°, causing the illumination window of said first cover board to coincide with said viewfinder, and at the same time said switching lever is forced into the On position by said stepped transmission portion.

* * * * *